US008833119B2

(12) United States Patent
Noma

(10) Patent No.: US 8,833,119 B2
(45) Date of Patent: Sep. 16, 2014

(54) ELECTRIC STEERING LOCK DEVICE

(71) Applicant: U-Shin Ltd., Tokyo (JP)

(72) Inventor: Hideki Noma, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 30 days.

(21) Appl. No.: 13/687,444

(22) Filed: Nov. 28, 2012

(65) Prior Publication Data

US 2013/0133449 A1    May 30, 2013

(30) Foreign Application Priority Data

Nov. 28, 2011    (JP) ................................. 2011-259608

(51) Int. Cl.
     *B60R 25/02*      (2013.01)
     *B60R 25/00*      (2013.01)
     *B60R 25/0215*      (2013.01)

(52) U.S. Cl.
     CPC ........... *B60R 25/002* (2013.01); *B60R 25/0215* (2013.01)
     USPC .................................. 70/186; 70/183; 70/252

(58) Field of Classification Search
     USPC ............................................ 70/182–186, 252
     See application file for complete search history.

(56) References Cited

U.S. PATENT DOCUMENTS

| | | | | |
|---|---|---|---|---|
| 4,759,203 A | * | 7/1988 | Lieb et al. .......................... | 70/185 |
| 6,125,671 A | * | 10/2000 | Suzuki ............................. | 70/186 |
| 6,295,848 B1 | * | 10/2001 | Suzuki ............................. | 70/186 |
| 6,327,882 B1 | * | 12/2001 | Canard ............................ | 70/186 |
| 6,862,907 B2 | * | 3/2005 | Hayashi et al. .................. | 70/186 |
| 7,328,596 B2 | * | 2/2008 | Hasegawa et al. .............. | 70/186 |
| 7,703,309 B2 | * | 4/2010 | Okuno et al. .................... | 70/186 |
| 7,823,426 B2 | * | 11/2010 | Okuno et al. .................... | 70/186 |
| 7,856,858 B2 | * | 12/2010 | Laval et al. ...................... | 70/186 |
| 8,240,176 B2 | * | 8/2012 | Okada ............................. | 70/182 |
| 8,256,252 B2 | * | 9/2012 | Okada ............................. | 70/182 |
| 8,424,348 B2 | * | 4/2013 | Dimig et al. ..................... | 70/186 |
| 8,505,346 B2 | * | 8/2013 | Sugimoto ........................ | 70/252 |
| 8,561,442 B2 | * | 10/2013 | Farmer et al. ................... | 70/186 |
| 8,646,295 B2 | * | 2/2014 | Sugimoto ........................ | 70/186 |
| 8,646,296 B2 | * | 2/2014 | Okada et al. .................... | 70/186 |
| 2004/0027239 A1 | * | 2/2004 | Hayashi et al. ............... | 340/5.61 |
| 2004/0107750 A1 | * | 6/2004 | Fukushima ...................... | 70/186 |
| 2008/0087056 A1 | * | 4/2008 | Tsukazaki ....................... | 70/182 |
| 2010/0064742 A1 | * | 3/2010 | Okada et al. .................... | 70/185 |
| 2010/0083716 A1 | * | 4/2010 | Fukatsu et al. .................. | 70/186 |
| 2010/0212377 A1 | * | 8/2010 | Graglia ........................... | 70/183 |
| 2011/0296881 A1 | * | 12/2011 | Tamezane et al. .............. | 70/252 |

* cited by examiner

*Primary Examiner* — Suzanne Barrett
(74) *Attorney, Agent, or Firm* — Westerman, Hattori, Daniels & Adrian, LLP

(57) ABSTRACT

An electric steering lock device includes: a shaft which includes a male threaded portion and which is rotationally driven by an electric motor; a slider which includes a female threaded portion threadedly engaging with the male threaded portion and which advances and retreats in response to the rotation of the shaft; a lock member which is turnable between a locked position and an unlocked position in response to the advancement and retreat of the slider; a stopper which holds the lock member at the unlocked position by engaging with an engagement portion provided in the lock member, the stopper being movable in a direction orthogonal to a turning plane of the lock member; and a spring for biasing the stopper in an engagement direction. The stopper engages with and disengages from the engagement portion of the lock member by being moved by an operation portion provided in the slider.

7 Claims, 7 Drawing Sheets

ELECTRIC STEERING LOCK DEVICE

BACKGROUND OF THE INVENTION

1. Field of the Invention

The present invention relates to an electric steering lock device (ESL) for electrically locking the rotation of a steering wheel when a vehicle is parked.

2. Description of the Related Art

Recently, there is a vehicle equipped with an electric steering lock device for electrically locking the rotation of a steering wheel during the parking for the purpose of preventing theft.

As an example of such an electric steering lock device, Japanese Patent Application Publication No. 2006-036110 has proposed a device including: a shaft which includes a male threaded portion and which is rotationally driven by an electric motor; a lock stopper which includes a female threaded portion threadedly engaging with the male threaded portion of the shaft and which advances and retreats in response to the rotation of the shaft; and a lock bar which is coupled to the lock stopper via a pin and which is engageable with and disengageable from a recessed groove of a steering shaft.

However, in the electric steering lock device proposed in Japanese Patent Application Publication No. 2006-036110, if the pin breaks due to deterioration over time, the movement of the lock bar cannot be restricted. Hence, when some kind of load is applied to the lock bar and the lock bar thereby moves to a locked position, the steering shaft may be unintentionally locked.

SUMMARY OF THE INVENTION

The present invention has been made in view of the problem described above, and an object thereof is to provide an electric steering lock device capable of preventing a lock member in an unlocked position from moving to a locked position to surely prevent unintentional lock of a steering shaft.

For the purpose of attaining the foregoing object, a first aspect of the present invention is an electric steering lock device comprising: a shaft which includes a male threaded portion and which is rotationally driven by an electric motor; a slider which includes a female threaded portion threadedly engaging with the male threaded portion and which advances and retreats in response to the rotation of the shaft; a lock member which is turnable between a locked position and an unlocked position in response to the advancement and retreat of the slider, the locked position being a position where the lock member comes in engagement with a steering shaft, and the unlocked position being a position where the engagement is released; a stopper which comes into engagement with an engagement portion provided in the lock member and thereby holds the lock member at the unlocked position, the stopper being movable in a direction orthogonal to a turning plane of the lock member; and biasing means for biasing the stopper in an engagement direction, wherein the stopper is engaged with and disengaged from the engagement portion of the lock member by being moved by an operation portion provided in the slider.

A second aspect of the present invention is the electric steering lock device of the first aspect of the present invention, wherein: a movement prevention portion is provided in the lock member; and when the lock member moves from the locked position to the unlocked position, the stopper comes into contact with the movement prevention portion and the movement of the stopper in the engagement direction is prevented while the turning of the lock member to the unlocked position is allowed.

A third aspect of the present invention is the electric steering lock device of the first or second aspect of the present invention, further comprising biasing means for biasing the lock member toward a locked position, wherein: the slider and the lock member are coupled together by bringing a coupling portion of the lock member into engagement with the inside of a coupling hole provided in the slider; and the coupling hole is an elongated hole elongated in an advancing-retreating direction of the slider in such a way that the slider is allowed to move relative to the lock member up to a point where the engagement between the engagement portion of the lock member and the stopper is released.

4. A fourth aspect of the present invention is the electric steering lock device of any one of the first to third aspects of the present invention, wherein: the operation portion of the slider is provided on one side of the turning plane of the lock member and the biasing means for biasing the stopper is provided on the other side of the turning plane; and the stopper is arranged in a way that advances and retreats in the direction orthogonal to the turning plane of the lock member at a position where the stopper overlaps the slider.

According to the first aspect of the present invention, when the lock member moves to the unlocked position, the stopper is in engagement with the lock member, and prevents the lock member from moving in the locking direction. The lock member is thereby held at the unlocked position. Accordingly, the unintentional locking of the steering shaft is surely prevented and high safety is secured.

Moreover, since the stopper is moved to engage with and disengage from the lock member by the operation portion provided in the slider for turning the lock member, no actuator or the like for moving the stopper need be provided additionally. Hence, it is possible to simplify the structure and reduce the cost.

According to the second aspect of the present invention, while the lock member turns from the locked position to the unlocked position, the operation portion of the slider acts to move the stopper from the disengagement position to the engagement position. However, the stopper is prevented from moving to the engagement position by being brought into contact with the movement preventing portion of the lock member. Thereafter, when the lock member turns to the unlocked position and the engagement portion of the lock member and the stopper are thereby set into an engageable state, the stopper moves to the engagement position due to the biasing force of the biasing means and holds the lock member in the unlocked state. In other words, when the slider moves by such an amount that the lock member is turned from the locked position to the unlocked position, the stopper also moves from the disengagement position to the engagement position. Accordingly, the stopper can be moved without increasing the movement range of the slider, and a reduction in the size of the electric steering lock device is achieved.

According to the third aspect of the present invention, the lock member and the slider are coupled together in a way movable relative to each other. Accordingly, even when the lock member is in engagement with the stopper, the slider can move from the unlocked position to the locked position. Moreover, at this time, the stopper can be moved from the engagement position to the disengagement position. Then, once the engagement between the engagement portion of the lock member and the stopper is released, the lock member turns in the locked position direction due to the biasing force of the biasing means, and the coupling portion thereof comes into contact with the edge of the coupling hole of the slider. The slider then moves to the locked position, and the lock member thereby turns to the locked position. In other words, when the slider moves by such an amount that the lock member is turned from the unlocked position to the locked position, the stopper also moves from the engagement position to the disengagement position. Accordingly, the stopper can be moved without increasing the movement range of the slider, and the reduction in the size of the electric steering lock device is thereby achieved.

According to the fourth aspect of the present invention, the stopper is arranged in a way that advances and retreats in the direction orthogonal to the turning plane of the lock member at the position where the stopper overlaps the slider. Accordingly, the reduction in the size of the electric steering lock device is achieved.

DESCRIPTION OF THE PREFERRED EMBODIMENT

An embodiment of the present invention is descried below based on the attached drawings.

Figure 1:
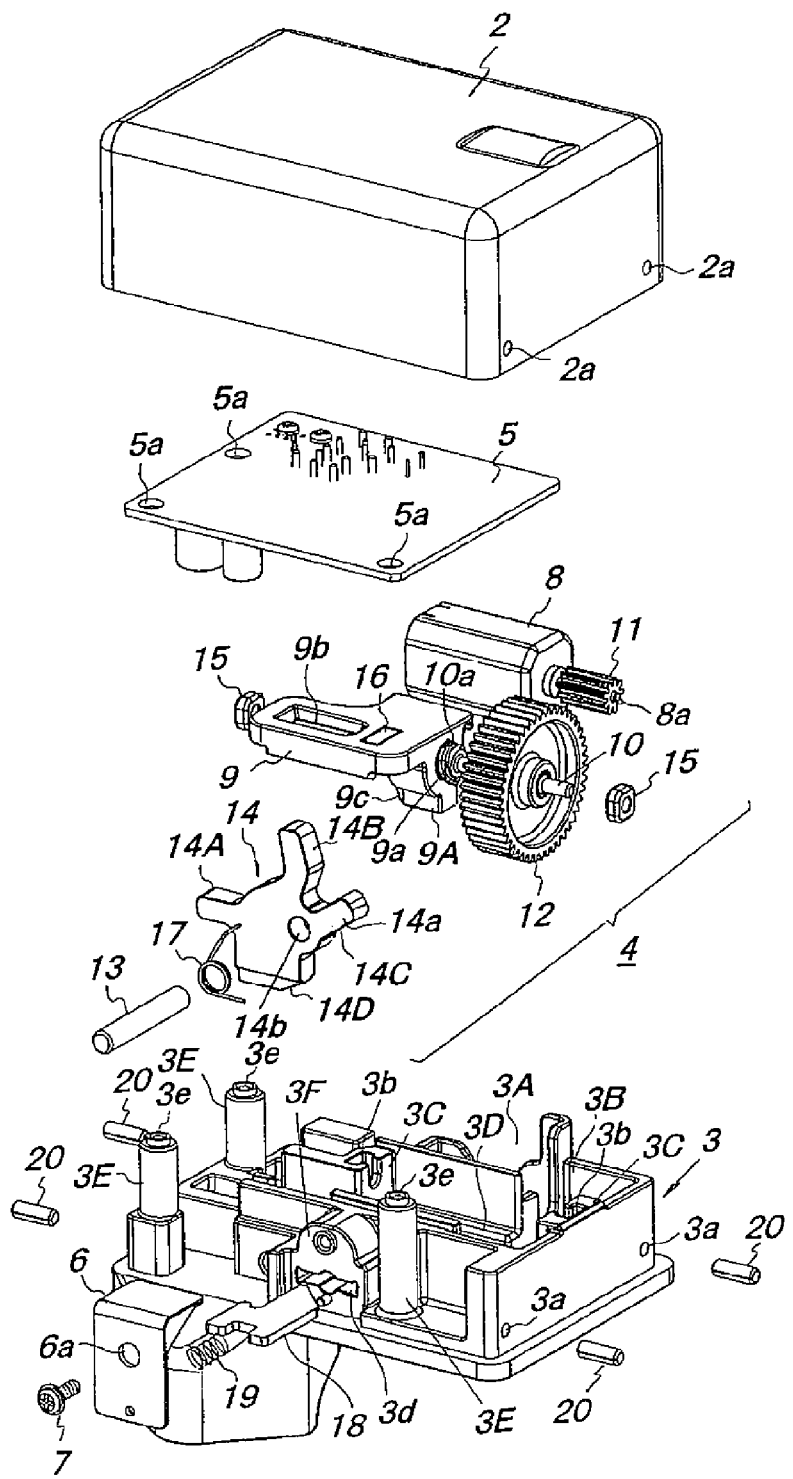
FIG. 1 is an exploded perspective view of an electric steering lock device of the present invention.
Figure 2:
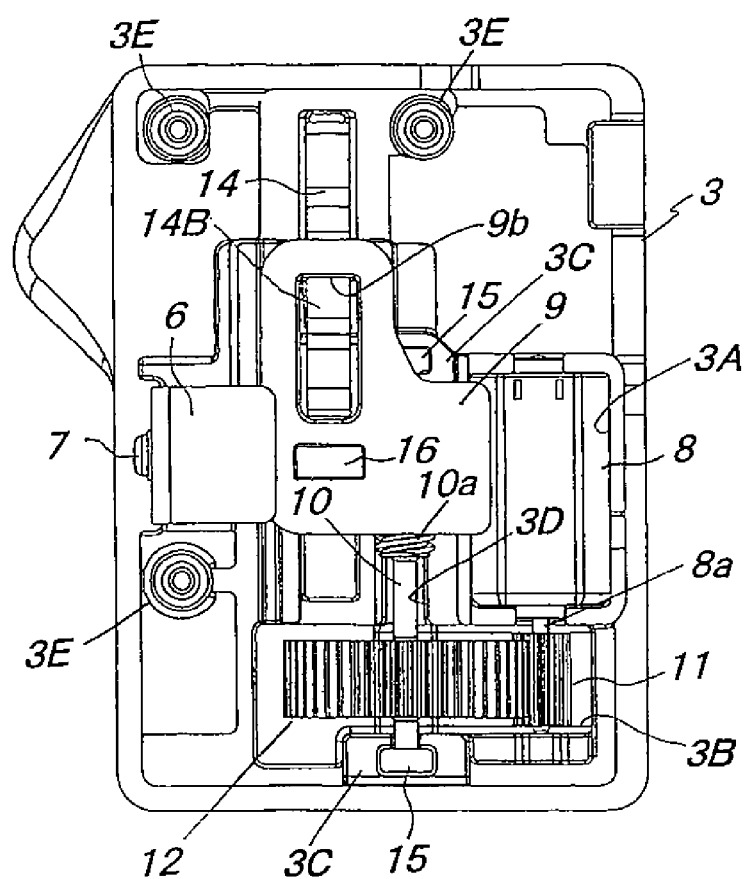
FIG. 2 is a plan view showing the electric steering lock device of the present invention with a cover and a printed circuit board removed from the electric steering lock device.
Figure 3:
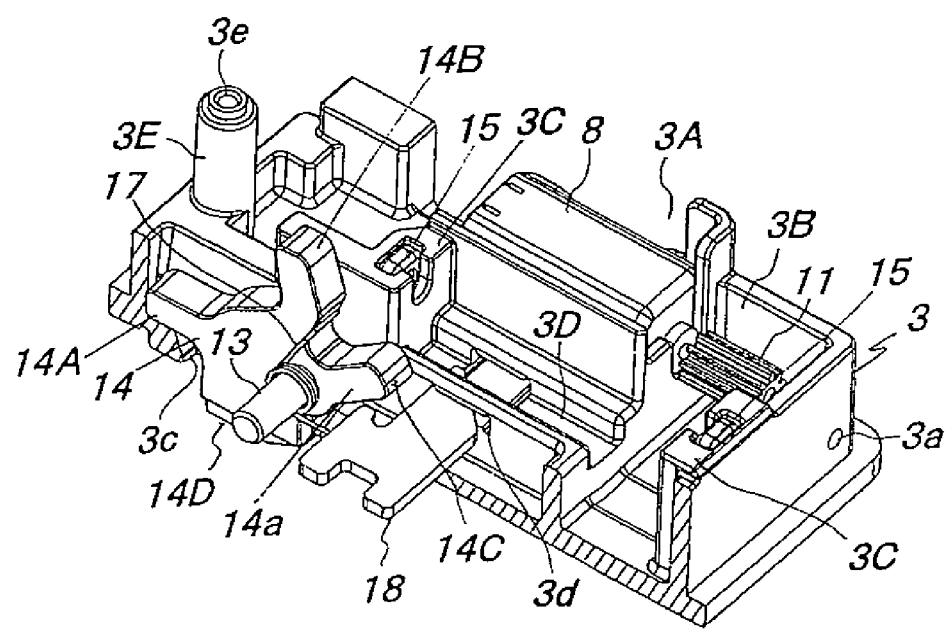
FIG. 3 is a broken perspective view of a main portion of the electric steering lock device of the present invention.
Figure 4:
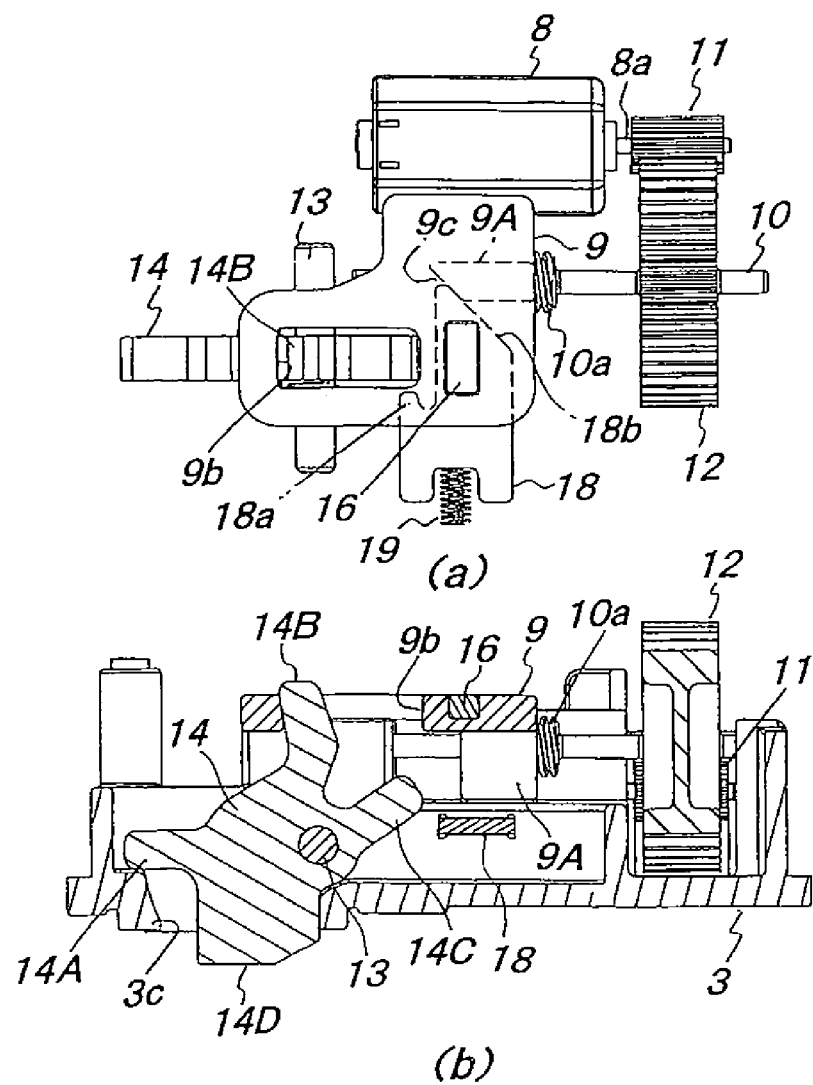
FIGS. 4A and 4B are respectively a plan view and a cross-sectional view showing the main portion of the electric steering lock device of the present invention in a locked state.
Figure 5:
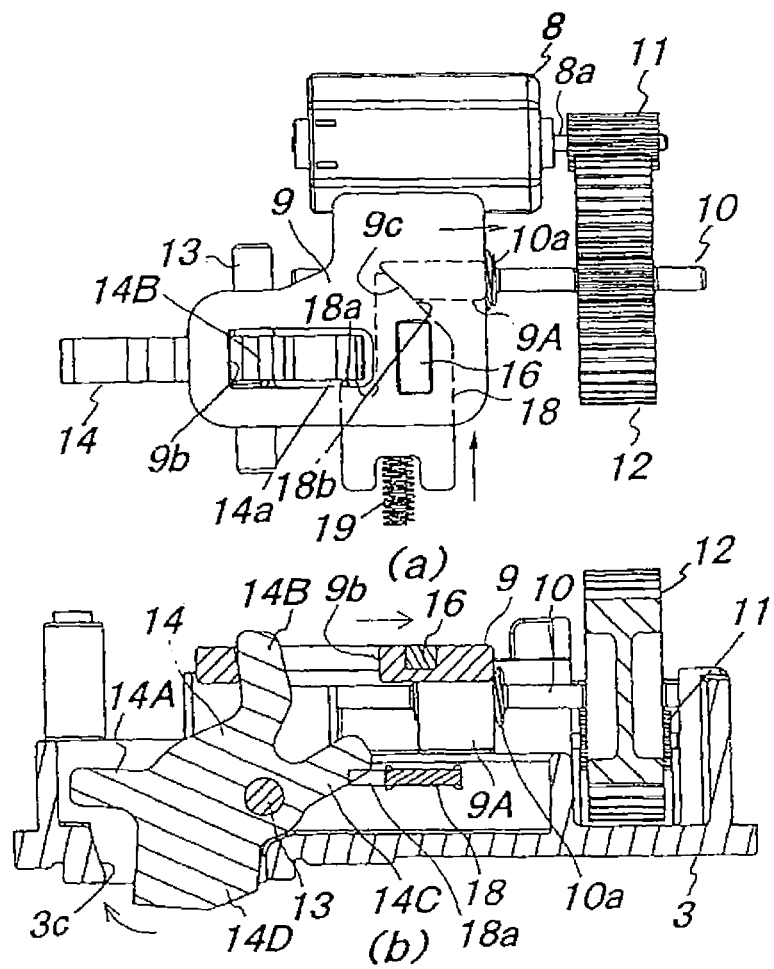
FIGS. 5A and 5B are respectively a plan view and a cross-sectional view showing the main portion of the electric steering lock device of the present invention which is transitioning from the locked state to an unlocked state.

FIG. 1 is an exploded perspective view of an electric steering lock device of the present invention. FIG. 2 is a plan view showing the electric steering lock device with a cover and a printed circuit board removed from the electric steering lock device. FIG. 3 is a broken perspective view of a main portion of the electric steering lock device. FIGS. 4A and 4B are respectively a plan view and a cross-sectional view showing the main portion of the electric steering lock device in a locked state. FIGS. 5A and 5B are respectively a plan view and a cross-sectional view showing the main portion of the electric steering lock device which is transitioning from the locked state to an unlocked state. FIGS. 6A and 6B are respectively a plan view and a cross-sectional view showing the main portion of the electric steering lock device in the unlocked state. FIGS. 7A and 7B are respectively a plan view and a cross-sectional view showing the main portion of the electric steering lock device which is transitioning from the unlocked state to the locked state.

An electric steering lock device 1 of the present invention is a device which electrically locks and unlocks rotation of a steering shaft (steering wheel) not illustrated, and is attached to a cylindrical steering column not illustrated. Although not illustrated, the steering shaft is rotatably inserted in the steering column, the steering wheel is connected to an upper end of the steering shaft, and a lower end portion of the steering shaft is coupled to a steering gear box. When a driver performs a rotating operation of the steering wheel, the rotation is transmitted to the steering gear box via a steering shaft, and a rack shaft provided in the steering gear box moves in a vehicle width direction. This movement is transmitted to the right and left front wheels, which are the steering wheels, via tie rods, and the front wheels are thereby steered.

As shown in FIG. 1, the electric steering lock device 1 includes: a cover 2; a base 3 housed in the cover 2; a lock mechanism 4 assembled to the base 3; a printed circuit board 5; and the like.

The cover 2 is made of a metal such as a magnesium alloy which is a non-magnetic material, and is formed in a rectangular box shape. Circular pin holes 2a (only two of which are illustrated in FIG. 1) are formed in both of lower portions of side surfaces of the cover 2 which face each other.

The base 3 is a member incorporated into the cover 2 from a lower surface opening portion of the cover 2. Circular pin holes 3a (only two which are illustrated in FIG. 1) are formed in both of side portions of the base 3 which face each other (portions corresponding to the pin holes 2a of the cover 2). Integrally formed in the base 3 are a motor housing portion 3A, a gear housing portion 3B, a pair of bearing supporting blocks 3C uprightly provided and standing away from each other, a linear rail-shaped recessed portion 3D formed between the bearing supporting blocks 3C to extend in a longitudinal direction, three columnar board supporting bosses 3E, a stopper holding block 3F, and the like. As shown in FIGS. 1 and 2, a holding plate 6 bent in a L-shape is attached to a side portion of the base 3 with a screw 7 inserted into a circular hole 6a of the holding plate 6.

The lock mechanism 4 incorporated in the base 3 includes: an electric motor 8 which is a drive source; a slider 9 which is supported movably in a direction parallel to an output shaft 8a of the electric motor 8 (i.e., in the up-down direction in FIG. 2); a shaft 10 which is arranged to extend in the moving direction of the slider 9; a small-diameter pinion gear 11 which is connected to an end portion of the output shaft 8a of the electric motor 8; a large-diameter wheel gear 12 which is connected to one end of the shaft 10; a lock member 14 which is rotatably and pivotally supported on the base 3 by a turning shaft 13; and the like.

A female threaded portion 9a is provided in the slider 9 to penetrate therethrough in a direction parallel to the output shaft 8a of the electric motor 8. A male threaded portion 10a formed in an intermediate portion of the shaft 10 in a longitudinal direction thereof threadedly engages with the female threaded portion 9a. Both end portions of the shaft 10 which protrude from the slider 9 are supported by bearings 15 fitted to recessed portions 3b at upper ends of the bearing supporting blocks 3C formed in the base 3, respectively. A coupling hole 9b having an elongated hole shape and elongated in a moving direction of the slider 9 (i.e., in the up-down direction in FIG. 2) is formed in the slider 9. A magnet 16 for position detection is embedded in a top surface of the slider 9. Moreover, a block-shaped protruding portion 9A is provided integrally with a lower portion of the slider 9 to protrude downward, and an operation portion 9c having an inclined surface shape as shown in FIG. 4A is formed in an end surface of the protruding portion 9A.

Furthermore, as shown in FIGS. 1 and 3, a contact portion 14A, a coupling portion 14B, an engagement portion 14C, and a lock portion 14D which extend outward in radial directions like branches are formed in the lock member 14. An outer end surface of the engagement portion 14C forms a movement preventing portion 14a. A circular shaft insertion hole 14b is formed in the lock member 14, and the lock member 14 is rotatably and pivotally supported on the side portion of the base 3 by the turning shaft 13 inserted in the shaft insertion hole 14b. Moreover, the lock member 14 is biased in a locking direction (i.e., in the counterclockwise direction in FIG. 4B) by a spring 17 which is biasing means wound around the turning shaft 13. In the state where the lock member 14 is rotatably and pivotally supported on the base 3 as described above, as shown in FIG. 4B, the coupling portion 14B of the lock member 14 is in engagement with the coupling hole 9b formed in the slider 9, and the lock portion 14D faces a through-hole 3c formed in a bottom portion of the base 3.

As shown in FIGS. 2 and 3, the electric motor 8 of the lock mechanism 4 configured as described above is fitted and housed in the motor housing portion 3A of the base 3 in a lateral orientation while the pinion gear 11 connected to the output shaft 8a of the electric motor 8 is housed in the gear housing portion 3B of the base 3.

Moreover, both ends of the shaft 10 threadedly engaging with and inserted into the slider 9 are supported by the bearing supporting blocks 3C of the base 3 via the bearings 15, and the slider 9 is thereby moveably supported on the base 3. In addition, the protruding portion 9A projectingly provided in the lower portion of the slider 9 is fitted to the rail-shaped recessed portion 3D of the base 3, and the rotation of the slider 9 is thereby prevented. In this state, the slider 9 can move in the longitudinal direction (i.e., in the up-down direction FIG. 2) of the shaft 10 while guided by the rail-shaped recessed portion 3D. Furthermore, the lifting of the slider 9 is prevented by the holding plate 6. Moreover, as shown in FIG. 2, the wheel gear 12 connected to the end portion of the shaft 10 is housed in the gear housing portion 3B of the base 3, as well as the wheel gear 12 and the pinion gear 11 mesh with each other.

A stopper holding hole 3d having an elongated hole shape and elongated in the lateral direction is formed in the stopper holding block 3F formed in the base 3. As shown in FIGS. 1 and 3, the stopper holding hole 3d extends from a side portion of the stopper holding block 3F to the rail-shaped recessed portion 3D. A plate-shaped stopper 18 is inserted in the stopper holding hole 3d. The stopper 18 is held movably in a direction orthogonal to a turning plane of the lock member 14 (i.e., in the up-down direction in FIG. 4A), and is biased in an engagement direction (i.e., in the upward in FIG. 4A) by a spring 19 which is biasing means contracted and installed between the stopper and the holding plate 6. As shown in FIG. 4A, a protrusion-shaped contact portion 18a is formed in the stopper 18, and an obliquely-cut inclined surface portion 18b is formed in a front end of the stopper 18. The inclined surface portion 18b is in engagement with the inclined-surface-shaped operation portion 9c which is formed in the protruding portion 9A of the slider 9.

After the lock mechanism 4 and the stopper 18 which are described above are assembled to the base 3, the printed circuit board 5 shown in FIG. 1 is placed on the three board supporting bosses 3E uprightly provided in the base 3. The printed circuit board 5 is horizontally attached to the base 3 by: inserting not-illustrated screws from above into circular screw insertion holes 5a formed in three portions of the printed circuit board 5: and fastening the screws to screw holes 3e formed in upper portions of the board supporting bosses 3E. Although not illustrated, magnetism detection devices, such as hall-effect devices, which are configured to detect the locked state and the unlocked state by detecting the magnetism of the magnet 16 embedded in the top surface of the slider 9 are provided in a lower surface of the printed circuit board 5 at positions corresponding to a locked position and an unlocked position.

Then, the base 3 to which the lock mechanism 4, the stopper 18, and the printed circuit board 5 are assembled is incorporated in the cover 2 from the lower surface opening portion of the cover 2, and is fixed to the cover 2 by press-fitting pins 20 (see FIG. 1) into the four pin holes 2a formed in the side portions of the cover 2 and into the four pin holes 3a formed in the side portions of the base 3, respectively. The assembly work of the electric steering lock device 1 is thereby completed. In the state where the electric steering lock device 1 is assembled as described above, as shown in FIG. 4A, the operation portion 9c of the slider 9 is disposed on one side of the turning plane of the lock member 14 while the spring 19 biasing the stopper 18 is disposed on the other side thereof. The stopper 18 is disposed in a way that retreats and advances in the direction orthogonal to the turning plane of the lock member 14 at a position where the stopper 18 overlaps the slider 9.

Next, description is given below of the operations (the locking operation and the unlocking operation) of the electric steering lock device 1 configured as described above, on the basis of FIGS. 4 to 7.

As shown in FIGS. 4A and 4B, in a state where a not-illustrated engine stops, the slider 9 is at the locked position at a left limit in FIGS. 4A and 4B; the coupling portion 14B of the lock member 14 biased by the spring 17 in the counter-clockwise direction in FIG. 4B is in contact with the coupling hole 9c of the slider 9; and the contact portion 14A of the lock member 14 is in contact with an edge of the through-hole 3c in the bottom surface of the base 3. Accordingly, the lock member 14 is at a locked position which is not illustrated. When the lock member 14 is at the locked position as described above, as shown in FIG. 4B, the lock portion 14D of the lock member 14 protrudes to the outside from the through-hole 3c of the base 3, and engages with a recessed groove of the not-illustrated steering shaft, thereby locking the rotation of the steering shaft. When the rotation of the steering shaft is locked as described above, the rotation operation of the not-illustrated steering wheel connected to the upper end of the steering shaft cannot be performed, and vehicle theft is thereby prevented. In the locked state, the stopper 18 is at a disengaged position where the stopper 18 is not in engagement with the engagement portion 14C of the lock member 14.

When the driver turns on the not-illustrated engine start switch from the state described above and the electric steering lock device 1 receives an unlock signal from an external controller, a not-illustrated control unit provided in the printed circuit board 5 drives the electric motor 8, and the output shaft 8a of the electric motor 8 is rotationally driven in one direction. Thus, the rotation of the output shaft 8a of the electric motor 8 is then transmitted to the shaft 10 while reduced in speed by the pinion gear 11 and the wheel gear 12, and the shaft 10 is thereby rotationally driven.

Once the shaft 10 is rotationally driven as described above, the slider 9 provided with the female threaded portion 9a threadedly engaging with the male threaded portion 10a of the shaft 10 moves in an unlocking direction (i.e., in the direction of the arrows in FIGS. 5A and 5B), and the lock member 14 in engagement with the edge of the coupling hole 9b of the slider 9 turns in a direction of the arrow (i.e., in the clockwise direction) in FIG. 5B about the turning shaft 13 against a biasing force of the spring 17. At the same time, the stopper 18, whose inclined surface portion 18b at the front end is in engagement with the operation portion 9c formed in the protruding portion 9A of the slider 9, moves in the engagement direction (upward in FIG. 5A) due to a biasing force of the spring 19. Then, as shown in FIGS. 5A and 5B, the contact portion 18a of the stopper 18 comes into contact with the movement preventing portion 14a of the lock member 14.

Figure 6:
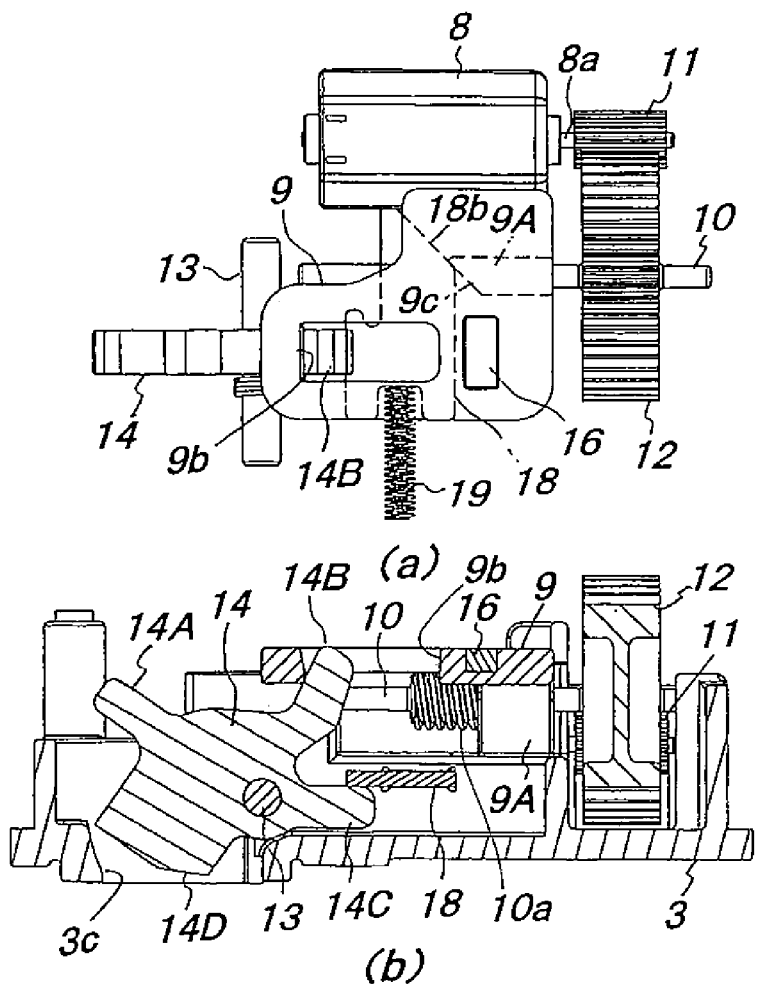
FIGS. 6A and 6B are respectively a plan view and a cross-sectional view showing the main portion of the electric steering lock device of the present invention in the unlocked state.
Figure 7:
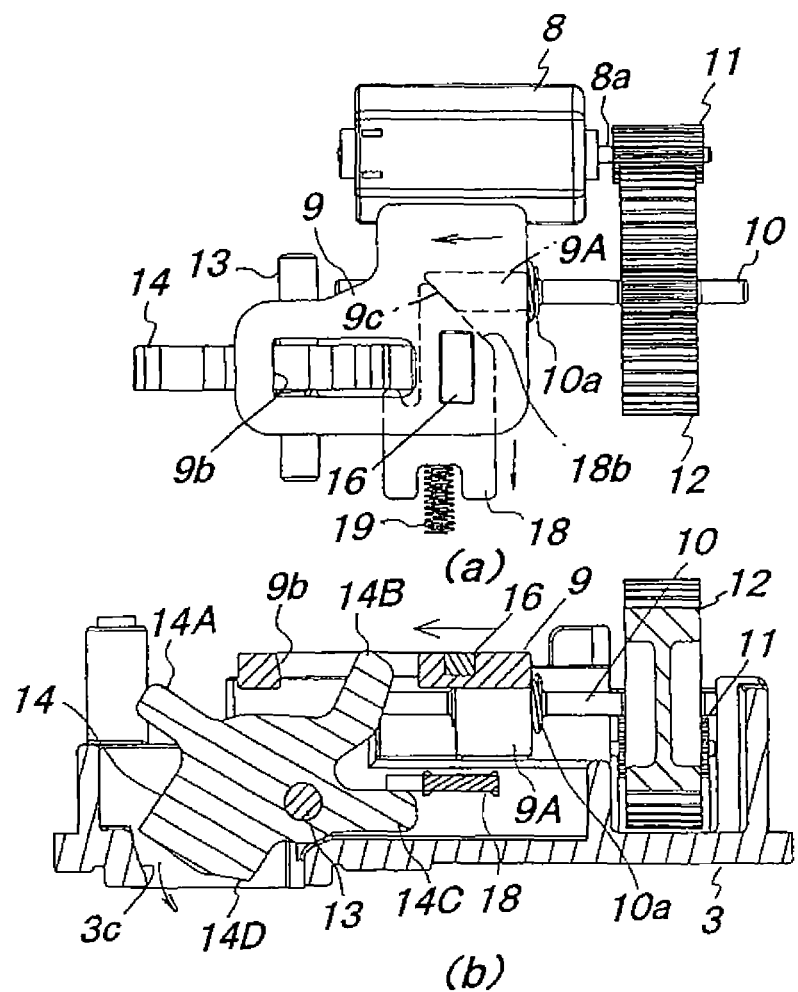
FIGS. 7A and 7B are respectively a plan view and a cross-sectional view showing the main portion of the electric steering lock device of the present invention which is transitioning from the unlocked state to the locked state.

Once, as described above, the contact portion 18a of the stopper 18 comes into contact with the movement preventing portion 14a of the lock member 14, the movement of the stopper 18 in the engagement direction is prevented, and a disengaged state where the lock member 14 is not in engagement with the stopper 18 is maintained. Accordingly, the lock member 14 is allowed to turn further. Then, when the slider 9 moves further in the locking direction (i.e., in the direction of the arrows in FIGS. 5A and 5B), the lock member 14, whose coupling portion 14B is in engagement with the edge of the coupling hole 9b of the slider 9, turns about the turning shaft 13 in the direction of the arrow (i.e., in the clockwise direction) in FIG. 5B to an unlocked position shown in FIG. 6, against the biasing force of the spring 17. In this unlocked state, as shown in FIGS. 6A and 6B, the engagement portion 14C of the lock member 14 moves away from the stopper 18. Accordingly, the contact between the movement preventing portion 14a of the lock member 14 and the contact portion 18a of the stopper 18 is released, and the stopper 18 moves in the engagement direction due to the biasing force of the spring 19 to come into engagement with the engagement portion 14C of the lock member 14. Hence, the rotation of the lock member 14 in a locking direction (i.e., in the counterclockwise direction in FIG. 6) is prevented, and the unlocked state of the lock member 14 is maintained. Accordingly, the unintentional locking of the steering shaft is surely prevented, and high safety is secured.

When the lock member 14 is at the unlocked position shown in FIGS. 6A and 6B, as shown in FIG. 6B, the lock portion 14D of the lock member 14 enters the base 3 from the through-hole 3c of the base 3, and the engagement between the lock portion 14D and the recessed groove of the not-illustrated steering shaft is released. Accordingly, the steering shaft (steering wheel) can freely rotate, and the steering operation by the drive is made possible.

Thereafter, once the vehicle stops and the driver turns off the engine start switch to stop the engine, the electric steering lock device 1 receives the lock signal from the external controller, and the not-illustrated control provided in the printed circuit board 5 activates the electric motor 8 to rotationally drive the output shaft 8a in a reverse direction. Then, the rotation of the output shaft 8a of the electric motor 8 is transmitted to the shaft 10 while reduced in speed by the pinion gear 11 and the wheel gear 12. The shaft 10 is thereby rotationally driven, and the slider 9 provided with the female threaded portion 9a threadedly engaging with the male threaded portion 10a of the shaft 10 moves in a locking direction (i.e., in the direction of the arrows in FIGS. 7A and 7B).

Once the slider 9 moves in the locking direction as described above, the stopper 18, whose inclined surface portion 18b at the front end is in engagement with the inclined-surface-shaped operation portion 9c formed in the protruding portion 9A of the slider 9, moves in a disengagement direction (i.e., in the direction of the arrow shown in FIG. 7A) against the biasing force of the spring 19. At this time, since the stopper 18 is in engagement with the engagement portion 14C of the lock member 14, the rotation of the lock member 14 is restricted, and the lock member 14 is held at the unlocked position. Meanwhile, since the elongated-hole-shaped coupling hole 9b is formed in the slider 9, the slider 9 alone can move in the locking direction (i.e., in the direction of the arrows in FIGS. 7A and 7B) even though the turning of the lock member 14 is locked.

Thereafter, the slider 9 moves further in the locking direction, and the stopper 18 moves further in the disengagement direction (i.e., in the direction of the arrows in FIGS. 7A and 7B) in response to the movement of the slider 9. Once the engagement between the stopper 18 and the engagement portion 14C of the lock member 14 is thereby released as shown in FIGS. 7A and 7B, the lock member 14 turns in the counterclockwise direction (i.e., in the direction of the arrow) in FIG. 7B about the turning shaft 13 due to the biasing force of the spring 17. Then, once the slider 9 moves to the locked position, the lock member 14 also turns to the locked position as shown in FIGS. 4A and 4B, and the locked state is established in which the coupling portion 14B of the lock member 14 is in engagement with the edge of the coupling hole 9b of the slider 9. In the locked state, as shown in FIG. 4B, the lock portion 14D of the lock member 14 protrudes to the outside from the through hole 3c of the base 3, and is in engagement with the recessed groove of the not-illustrated steering shaft thereby locking the rotation of the steering shaft. Once the rotation of the steering shaft is locked as described above, the rotation operation of the not-illustrated steering wheel connected to the upper end of the steering shaft cannot be performed, and the vehicle theft is thereby prevented.

As described above, in the electric steering lock device 1 of the present invention, when the lock member 14 is moved to the unlocked position, the stopper 18 is in engagement with the lock member 14, and prevents the lock member 14 from moving in the locking direction. The lock member 14 is thereby held at the unlocked position. Accordingly, the unintentional locking of the steering shaft is surely prevented, and high safety is secured.

Moreover, since the stopper 18 is moved to engage with and disengage from the lock member 14 by the operation portion 9c provided in the protruding portion 9A of the slider 9 for turning the lock member 14, no actuator or the like for moving the stopper 18 need be provided additionally. Hence, it is possible to simplify the structure and reduce the cost.

Furthermore, in the electric steering lock device 1 of the present invention, in the process of turning the lock member 14 from the locked position to the unlocked position, the operation portion 9c of the slider 9 acts to move the stopper 18 from the disengagement position to the engagement position. However, the stopper 18 is prevented from moving to the engagement position by coming into contact with the movement preventing portion 14a of the lock member 14. Thereafter, once the lock member 14 turns to the unlocked position and the engagement portion 14C of the lock member 14 and the stopper 18 thereby enters into an engageable state, the stopper 18 moves to the engagement position due to the biasing force of the spring 19, and holds the lock member 14 in the unlocked state. In other words, when the slider 9 moves by such an amount that the lock member 14 can be turned from the locked position to the unlocked position, the stopper 18 also moves from the disengagement position to the engagement position. Accordingly, the stopper 18 can be moved without increasing the movement range of the slider 9, and the reduction in the size of the electric steering lock device 1 is achieved.

In order to hold the lock member 14 at the unlocked position by the stopper 18, the stopper 18 needs to be moved and engaged with the engagement portion 14C of the lock member 14 after the lock member 14 moves to the unlocked position. In this case, in a conventional configuration, the slider 9 needs to move further to make the stopper 18 work after the lock member 14 is moved to the unlocked position, which causes a problem that such a large movement range of the slider 9 requires the electric steering lock device 1 to be large in size. The present invention, however, makes it possible to achieve a reduction in the size of the electric steering lock device 1 by employing the configuration described above.

Moreover, in the electric steering lock device 1 of the present invention, the lock member 14 and the slider 9 are coupled to each other via the elongated-hole-shaped coupling hole 9b of the slider 9 in a way movable relative to each other. Accordingly, even when the lock member 14 is in engagement with the stopper 18, the slider 9 can move from the unlocked position to the locked position. Moreover, at this time, the stopper can be moved from the engagement position to the disengagement position. Then, once the engagement between the engagement portion 14C of the lock member 14 and the stopper 18 is released, the lock member 14 turns toward the locked position due to the biasing force of the spring 17, and the coupling portion 14B thereof comes into contact with the edge of the coupling hole 9b of the slider 9. The slider 9 then moves to the locked position, and the lock member 14 thereby turns to the locked position. In other words, when the slider 9 moves by such an amount that the lock member 14 is turned from the unlocked position to the locked position, the stopper 18 also moves from the engagement position to the disengagement position. Accordingly, the stopper 18 can be moved without increasing the movement range of the slider 9, and the reduction in the size of the electric steering lock device 1 is thereby achieved.

In order to move the lock member 14 from the unlocked position to the locked position, the lock member 14 needs to be moved to the locked position after the engagement between the lock member 14 and the stopper 18 is released by operating the stopper 18. In this case, in a conventional configuration, the slider 9 needs to move the stopper 18 from the engagement position to the disengagement position and thereafter move further to turn the lock member 14 from the unlocked position to the locked position, which causes the problem that such a large movement range of the slider 9 requires the steering lock device 1 to be large in size. The present invention, however, makes it possible to achieve the reduction in the size of the electric steering lock device 1 by employing the configuration described above.

In the electric steering lock device 1 of the present invention, the stopper 18 is arranged in the way that advances and retreats in the direction orthogonal to the turning plane of the lock member 14 at the position where the stopper 18 overlaps the slider 9. Accordingly, the reduction in the size of the electric steering lock device 1 can be achieved.

What is claimed is:

1. An electric steering lock device comprising:
a shaft which includes a male threaded portion and which is rotationally driven by an electric motor;
a slider which includes a female threaded portion threadedly engaging with the male threaded portion, the slider advancing and retreating in response to rotation of the shaft;
a lock member which is turnable between a locked position and an unlocked position in response to the advancement and retreat of the slider, the locked position being a position where the lock member engages with a steering shaft, and the unlocked position being a position where the engagement is released;
a stopper which holds the lock member at the unlocked position by engaging with an engagement portion provided in the lock member, the stopper being movable in a direction orthogonal to a turning plane of the lock member; and
biasing means for biasing the stopper in an engagement direction,
wherein the stopper engages with and disengages from the engagement portion of the lock member by being moved by an operation portion provided in the slider.

2. The electric steering lock device according to claim 1, wherein
a movement prevention portion is provided in the lock member, and
when the lock member moves from the locked position to the unlocked position, the stopper comes into contact with the movement prevention portion and is prevented from moving in the engagement direction while allowing turning of the lock member to the unlocked position.

3. The electric steering lock device according to claim 1, wherein
the slider and the lock member are coupled together with a coupling portion of the lock member engaged with an inside of a coupling hole provided in the slider, and with the lock member biased toward a locked position by another biasing means, and
the coupling hole is an elongated hole that is long, in an advancing-retreating direction of the slider, enough to allow the slider to move relative to the lock member up to a point where the engagement between the engagement portion of the lock member and the stopper is released.

4. The electric steering lock device according to claim 1, wherein
the operation portion of the slider is provided on one side of the turning plane of the lock member and the biasing means for biasing the stopper is provided on another side of the turning plane, and
the stopper is arranged in a way that advances and retreats in the direction orthogonal to the turning plane of the lock member at a position where the stopper overlaps the slider.

5. The electric steering lock device according to claim 2, wherein
the slider and the lock member are coupled together with a coupling portion of the lock member engaged with an inside of a coupling hole provided in the slider, and with the lock member biased toward a locked position by another biasing means, and
the coupling hole is an elongated hole that is long, in an advancing-retreating direction of the slider, enough to allow the slider to move relative to the lock member up to a point where the engagement between the engagement portion of the lock member and the stopper is released.

6. The electric steering lock device according to claim 2, wherein
the operation portion of the slider is provided on one side of the turning plane of the lock member and the biasing means for biasing the stopper is provided on another side of the turning plane, and
the stopper is arranged in a way that advances and retreats in the direction orthogonal to the turning plane of the lock member at a position where the stopper overlaps the slider.

7. The electric steering lock device according to claim 3, wherein the operation portion of the slider is provided on one side of the turning plane of the lock member and the biasing means for biasing the stopper is provided on another side of the turning plane, and the stopper is arranged in a way that advances and retreats in the direction orthogonal to the turning plane of the lock member at a position where the stopper overlaps the slider.

* * * * *